(12) United States Patent
Landis et al.

(10) Patent No.: US 12,531,644 B2
(45) Date of Patent: Jan. 20, 2026

(54) TECHNIQUES FOR MEASURING SELF-INTERFERENCE IN FULL DUPLEX WIRELESS COMMUNICATIONS

(71) Applicant: QUALCOMM Incorporated, San Diego, CA (US)

(72) Inventors: Shay Landis, Hod Hasharon (IL); Idan Michael Horn, Hod Hasharon (IL); Yehonatan Dallal, Kfar Saba (IL)

(73) Assignee: QUALCOMM Incorporated, San Diego, CA (US)

( * ) Notice: Subject to any disclaimer, the term of this patent is extended or adjusted under 35 U.S.C. 154(b) by 447 days.

(21) Appl. No.: 17/893,915

(22) Filed: Aug. 23, 2022

(65) Prior Publication Data
US 2024/0072917 A1 Feb. 29, 2024

(51) Int. Cl.
H04B 17/345 (2015.01)
H04L 5/14 (2006.01)

(52) U.S. Cl.
CPC ............ *H04B 17/345* (2015.01); *H04L 5/14* (2013.01)

(58) Field of Classification Search
None
See application file for complete search history.

(56) References Cited

U.S. PATENT DOCUMENTS

2023/0125714 A1\* 4/2023 Lee ................ H04W 72/0446
370/277

\* cited by examiner

*Primary Examiner* — Kouroush Mohebbi
(74) *Attorney, Agent, or Firm* — QUALCOMM Incorporated

(57) ABSTRACT

Aspects described herein relate to defining gaps within a time period for measuring self-interference due to clutter. The gaps can be defined for a device to measure self-interference caused by reflection of the signal, or may be specified by a network node to cause the device to refrain from transmitting so the network node can measure self-interference caused by reflection of the signal.

29 Claims, 11 Drawing Sheets

TECHNIQUES FOR MEASURING SELF-INTERFERENCE IN FULL DUPLEX WIRELESS COMMUNICATIONS

FIELD OF THE DISCLOSURE

Aspects of the present disclosure relate generally to wireless communication systems, and more particularly, to techniques for measuring self-interference in full duplex (FD) wireless communications.

DESCRIPTION OF RELATED ART

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

Some devices (e.g., user equipment (UEs), gNBs, etc.) may be capable of communicating in full duplex (FD) where the device can transmit and receive signals at the same time. Clutter can result when a device transmission is reflected from a nearby surface and captured at the receiver of the device, causing self-interference to other signals received at the receiver. This self-interference can result in modem de-sensing.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an aspect, a method for wireless communication at a user equipment (UE) is provided that includes receiving, from a network node, an indication of a gap pattern of one or more gaps within a time period for measuring self-interference due to clutter, transmitting a signal to a receiving node over the time period, and measuring, during the one or more gaps, self-interference caused by reflection of the signal as received at a receiver of the UE.

According to another aspect, a method for wireless communication at a network node is provided that includes transmitting, for a UE, an indication of a gap pattern of one or more gaps within a time period for measuring self-interference due to clutter, transmitting a signal to the UE over periods of the time period that do not correspond to the one or more gaps, and refraining from transmitting the signal to the UE over the one or more gaps.

In another aspect, a method for wireless communication at a UE is provided that includes receiving, from a network node, an indication of a gap pattern of one or more gaps within a time period for measuring self-interference due to clutter, transmitting a signal to the network node over periods of the time period that do not correspond to the one or more gaps, and refraining from transmitting the signal to the network node over the one or more gaps.

In another aspect, a method for wireless communication at a network node is provided that includes transmitting, to a UE, an indication of a gap pattern of one or more gaps within a time period for measuring self-interference due to clutter, transmitting a signal to a receiving node over the time period, and measuring, during the one or more gaps, self-interference caused by reflection of the signal as received at a receiver of the network node.

In a further aspect, an apparatus for wireless communication is provided that includes a transceiver, a memory configured to store instructions, and one or more processors communicatively coupled with the transceiver and the memory. The one or more processors are configured to execute the instructions to perform the operations of methods described herein. In another aspect, an apparatus for wireless communication is provided that includes means for performing the operations of methods described herein. In yet another aspect, a computer-readable medium is provided including code executable by one or more processors to perform the operations of methods described herein.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
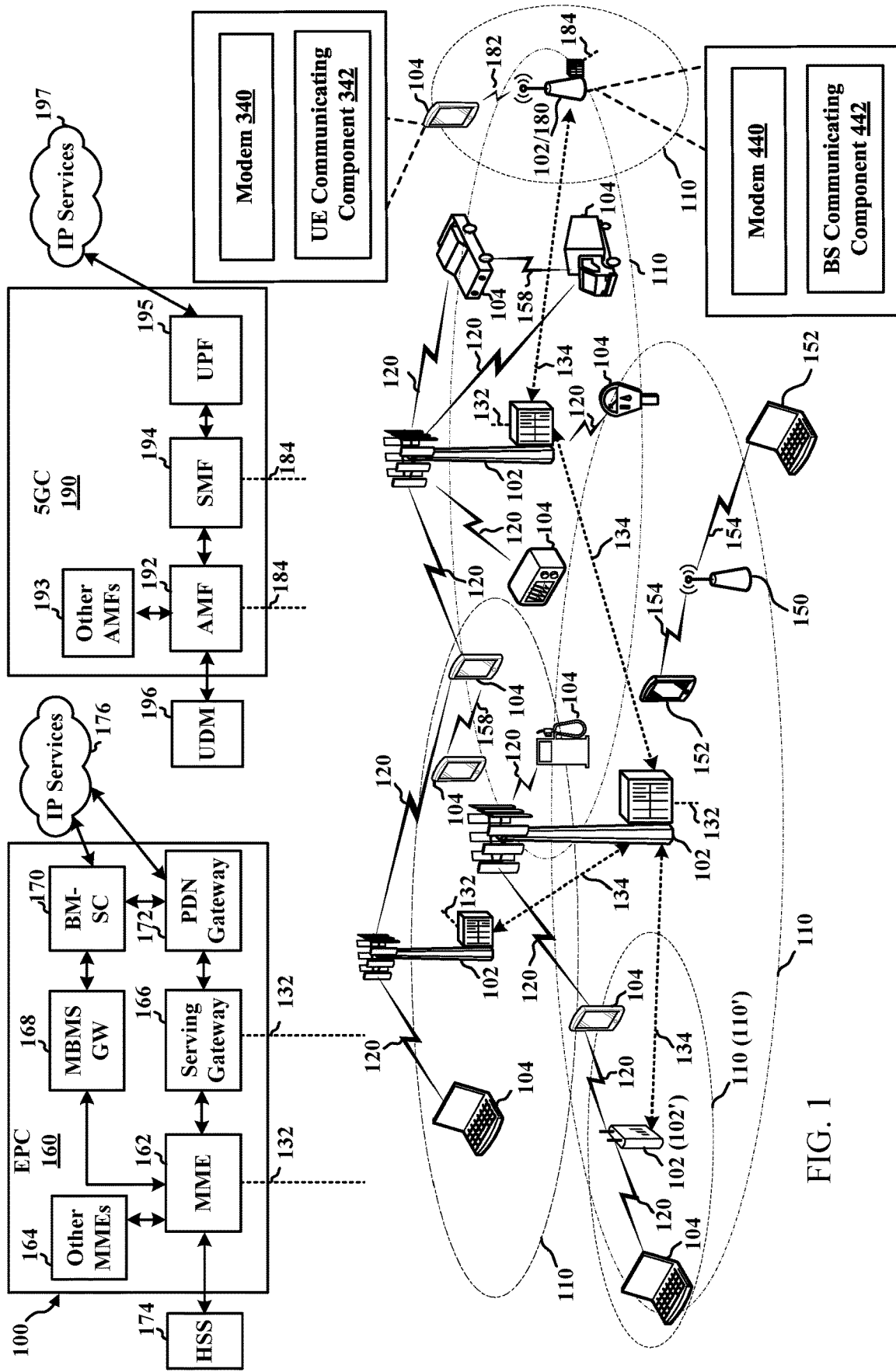
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to devices measuring self-interference in full-duplex (FD) wireless communications. In some wireless communication technologies, such as fifth generation (5G) new radio (NR) or other third generation partnership project (3GPP) technologies, devices (e.g., user equipment (UEs), network nodes, such as a gNB or a portion thereof, etc.) can communicate in FD by transmitting and receiving signals at the same time using the same or similar (e.g., partially or fully overlapping) frequency band. The device can experience self-interference when receiving signals from other devices where signals transmitted by the device are also received at the same time. This can be caused by clutter where the signals transmitted by the device hit a reflector or other surface and a redirected to the receiver of the device while receiving other signals. In some examples, the devices can estimate the self-interference, which can be non-linear distortion caused by the clutter, and can cancel out the self-interference to improve receiver performance while communicating in FD. In an example, gaps in transmissions to the device can be defined to allow the device to estimate the non-linear model that includes the clutter interference at the receiver that is caused by signals transmitted by the device. With knowledge of the non-linear model and of its own transmission, the device can effectively cancel the self-interference from received signals. In some examples, however, the model may change over time for a given device, which may be based on mobility of a device (e.g., of a UE) and/or mobility of objects causing clutter (e.g., for UEs, network nodes, or other devices).

Accordingly, aspects described herein relate to requesting or assigning gaps or gap patterns in transmitting signals by or to devices. The devices can use the gaps to measure signals and estimate the clutter model to effectively cancel self-interference from subsequently received signals. For example, the gaps may be defined based on one or more parameters, such as a density of the gaps, a duration of the gaps, and on/off pattern of the gaps over a period of time, etc. In one example, a UE can request gaps from a network node, and the network node can configure the UE with the gaps during which the network node does not transmit signals to the UE. The UE can use the gaps to transmit signals and receive possibly reflected signals for estimating the clutter model for canceling self-interference from subsequent transmissions at the UE. In another example, the network node can configure the UE to refrain from transmitting in one or more gaps, which the network node can use to transmit signals and receive possibly reflected signals for estimating the clutter model for canceling self-interference from subsequent transmissions at the network node. In one example, the gaps may be defined within a symbol (e.g., with an orthogonal frequency division multiplexing (OFDM) symbol, discrete Fourier transform (DFT)-spread (s)-OFDM symbol, etc.), within a slot of multiple symbols, and/or the like.

In an example, using gaps to estimate the clutter model can allow for more accurate determination and cancellation of self-interference, as other devices are not transmitting during the time self-interference is measured. In addition, defining the gaps over time can facilitate measuring the self-interference or otherwise estimating the model over time, so the device(s) can have an updated model of self-interference to account for mobility of the device or other objects causing clutter. This can, in turn, improve performance of FD communications, which can improve user experience when using the UE or other device. In addition, this can allow for conserving resources where the clutter model is not changing fast, and additional (or a fixed pattern) of gaps may not be required. In one example, an integrated access and backhaul (IAB) parent node can configure a downstream IAB node with desired gaps, which may improve IAB functionality where the IAB nodes may be mobile or may have self-interference caused by clutter from mobile objects.

The described features will be presented in more detail below with reference to FIGS. 1-11.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, single carrier-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein. In one example, some nodes of the wireless communication system may have a modem 340 and UE communicating component 342 for receiving gap information and using the gaps to measure self-interference or to refrain from transmitting communications, in accordance with aspects described herein. In addition, some nodes may have a modem 440 and BS communicating component 442 for transmitting gap information and using the gaps to refrain from transmitting communications or measure self-interference, in accordance with aspects described herein. Though a UE 104 is shown as having the modem 340 and UE communicating component 342 and a base station 102/gNB 180 is shown as having the modem 440 and BS communicating component 442, this is one illustrative example, and substantially any node or type of node may include a modem 340 and UE communicating component 342 and/or a modem 440 and BS communicating component 442 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, head compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). IoT UEs may include machine type communication (MTC)/enhanced MTC (eMTC, also referred to as category (CAT)-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS, e.g., BS 102), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

In an example, UE communicating component 342 can receive and/or request measurement gaps for measuring self-interference. For example, BS communicating component 442 can assign measurement gaps for the UE 104 and/or can refrain from transmitting during the measurement gaps, where the measurement gaps may be within a symbol (e.g., OFDM symbol, DFT-s-OFDM symbol, etc.). For example, the gaps may accordingly be defined as a portion of a symbol. In this example, UE communicating component 342 can transmit a signal over the symbol, and can measure self-interference caused by the signal at a receiver of the UE 104 during the measurement gaps. In another example, the gaps may be defined within a slot, such as a number of symbols (and/or portions of one or more symbols) within the slot. In another example, BS communicating component 442 can indicate, to the UE 104, measurement gaps for the base station 102. In one example, UE communicating component 342 can refrain from transmitting during the measurement gaps, where the measurement gaps may be within a symbol. In this example, BS communicating component 442 can transmit a signal over the symbol, and can measure self-interference caused by the signal at a receiver of the base station 102 during the measurement gaps.

Figure 2:
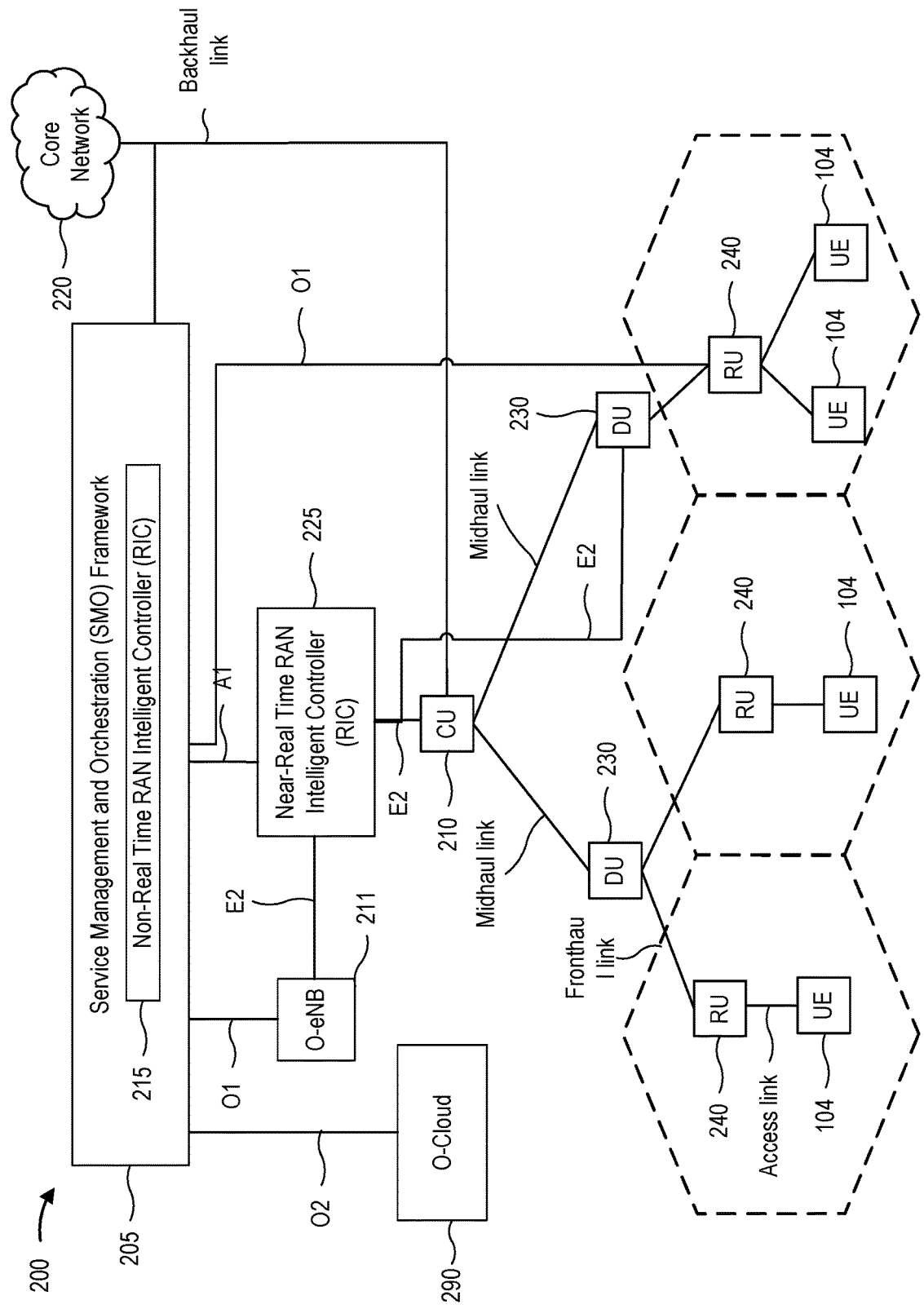
FIG. 2 is a diagram illustrating an example of disaggregated base station architecture, in accordance with various aspects of the present disclosure.

FIG. 2 shows a diagram illustrating an example of disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (MC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (i.e., Central Unit—User Plane (CU-UP)), control plane functionality (i.e., Central Unit—Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the third Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communication with one or more UEs 104. In some implementations, real-time and non-real-time aspects of control and user plane communication with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Turning now to FIGS. 3-11, aspects are depicted with reference to one or more components and one or more methods that may perform the actions or operations described herein, where aspects in dashed line may be optional. Although the operations described below in FIGS. 5, 6, 8, and 9 are presented in a particular order and/or as being performed by an example component, it should be understood that the ordering of the actions and the components performing the actions may be varied, depending on the implementation. Moreover, it should be understood that the following actions, functions, and/or described components may be performed by a specially programmed processor, a processor executing specially programmed software or computer-readable media, or by any other combination of a hardware component and/or a software component capable of performing the described actions or functions.

Figure 3:
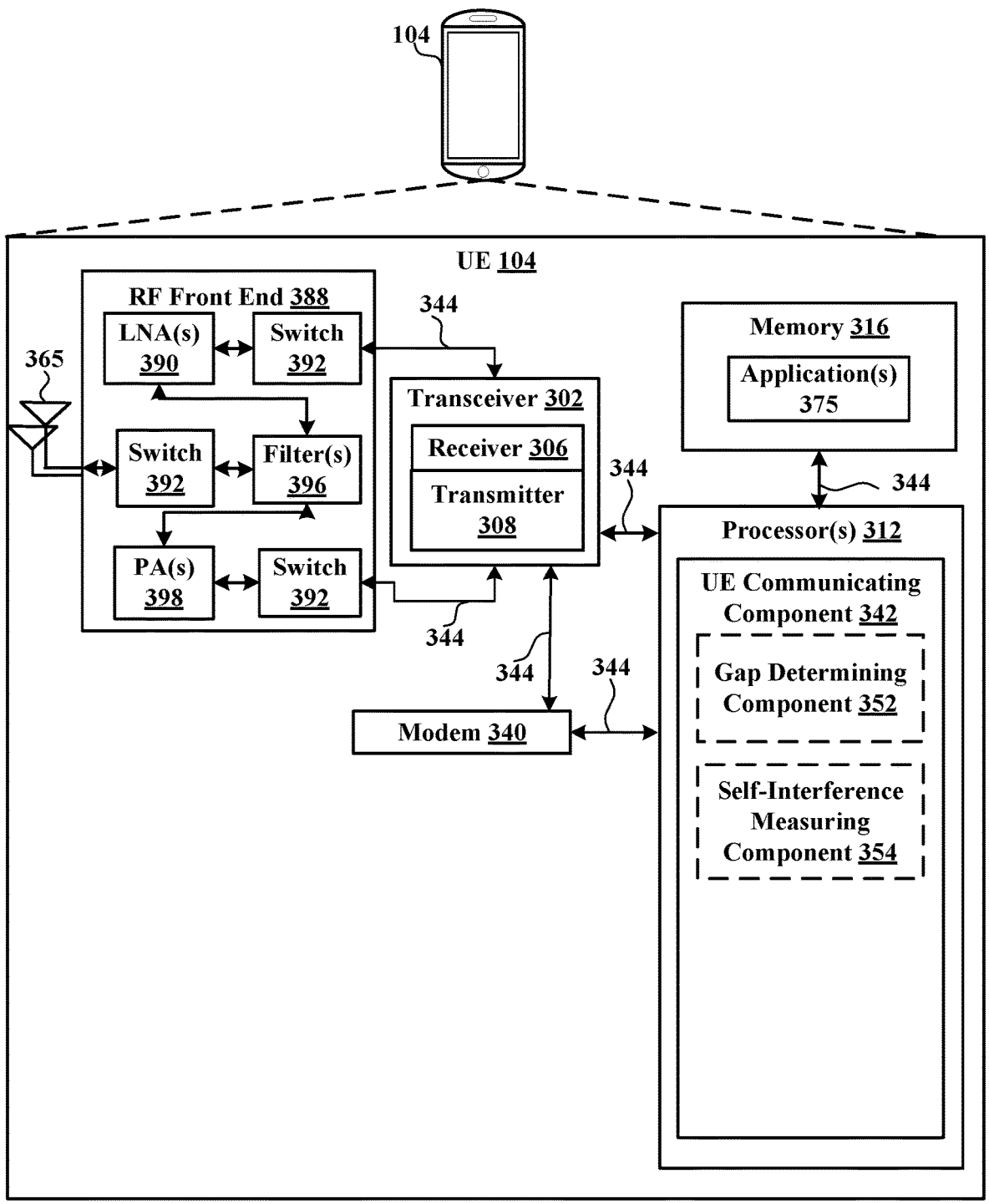
FIG. 3 is a block diagram illustrating an example of a user equipment (UE), in accordance with various aspects of the present disclosure.

Referring to FIG. 3, one example of an implementation of UE 104 may include a variety of components, some of which have already been described above and are described further herein, including components such as one or more processors 312 and memory 316 and transceiver 302 in communication via one or more buses 344, which may operate in conjunction with modem 340 and/or UE communicating component 342 for receiving gap information and using the gaps to measure self-interference or to refrain from transmitting communications, in accordance with aspects described herein.

In an aspect, the one or more processors 312 can include a modem 340 and/or can be part of the modem 340 that uses one or more modem processors. Thus, the various functions related to UE communicating component 342 may be included in modem 340 and/or processors 312 and, in an aspect, can be executed by a single processor, while in other aspects, different ones of the functions may be executed by a combination of two or more different processors. For example, in an aspect, the one or more processors 312 may include any one or any combination of a modem processor, or a baseband processor, or a digital signal processor, or a transmit processor, or a receiver processor, or a transceiver processor associated with transceiver 302. In other aspects, some of the features of the one or more processors 312 and/or modem 340 associated with UE communicating component 342 may be performed by transceiver 302.

Also, memory 316 may be configured to store data used herein and/or local versions of applications 375 or UE communicating component 342 and/or one or more of its subcomponents being executed by at least one processor 312. Memory 316 can include any type of computer-readable medium usable by a computer or at least one processor 312, such as random access memory (RAM), read only memory (ROM), tapes, magnetic discs, optical discs, volatile memory, non-volatile memory, and any combination thereof. In an aspect, for example, memory 316 may be a non-transitory computer-readable storage medium that stores one or more computer-executable codes defining UE communicating component 342 and/or one or more of its subcomponents, and/or data associated therewith, when UE 104 is operating at least one processor 312 to execute UE communicating component 342 and/or one or more of its subcomponents.

Transceiver 302 may include at least one receiver 306 and at least one transmitter 308. Receiver 306 may include hardware, firmware, and/or software code executable by a processor for receiving data, the code comprising instructions and being stored in a memory (e.g., computer-readable medium). Receiver 306 may be, for example, a radio frequency (RF) receiver. In an aspect, receiver 306 may receive signals transmitted by at least one base station 102. Additionally, receiver 306 may process such received signals, and also may obtain measurements of the signals, such as, but not limited to, Ec/Io, signal-to-noise ratio (SNR), reference signal received power (RSRP), received signal strength indicator (RSSI), etc. Transmitter 308 may include hardware, firmware, and/or software code executable by a processor for transmitting data, the code comprising instructions and being stored in a memory (e.g., computer-readable medium). A suitable example of transmitter 308 may including, but is not limited to, an RF transmitter.

Moreover, in an aspect, UE 104 may include RF front end 388, which may operate in communication with one or more antennas 365 and transceiver 302 for receiving and transmitting radio transmissions, for example, wireless communications transmitted by at least one base station 102 or wireless transmissions transmitted by UE 104. RF front end 388 may be connected to one or more antennas 365 and can include one or more low-noise amplifiers (LNAs) 390, one or more switches 392, one or more power amplifiers (PAs) 398, and one or more filters 396 for transmitting and receiving RF signals.

In an aspect, LNA 390 can amplify a received signal at a desired output level. In an aspect, each LNA 390 may have a specified minimum and maximum gain values. In an aspect, RF front end 388 may use one or more switches 392 to select a particular LNA 390 and its specified gain value based on a desired gain value for a particular application.

Further, for example, one or more PA(s) 398 may be used by RF front end 388 to amplify a signal for an RF output at a desired output power level. In an aspect, each PA 398 may have specified minimum and maximum gain values. In an aspect, RF front end 388 may use one or more switches 392 to select a particular PA 398 and its specified gain value based on a desired gain value for a particular application.

Also, for example, one or more filters 396 can be used by RF front end 388 to filter a received signal to obtain an input RF signal. Similarly, in an aspect, for example, a respective filter 396 can be used to filter an output from a respective PA 398 to produce an output signal for transmission. In an aspect, each filter 396 can be connected to a specific LNA 390 and/or PA 398. In an aspect, RF front end 388 can use one or more switches 392 to select a transmit or receive path using a specified filter 396, LNA 390, and/or PA 398, based on a configuration as specified by transceiver 302 and/or processor 312.

As such, transceiver 302 may be configured to transmit and receive wireless signals through one or more antennas 365 via RF front end 388. In an aspect, transceiver may be tuned to operate at specified frequencies such that UE 104 can communicate with, for example, one or more base stations 102 or one or more cells associated with one or more base stations 102. In an aspect, for example, modem 340 can configure transceiver 302 to operate at a specified frequency and power level based on the UE configuration of the UE 104 and the communication protocol used by modem 340.

In an aspect, modem 340 can be a multiband-multimode modem, which can process digital data and communicate with transceiver 302 such that the digital data is sent and received using transceiver 302. In an aspect, modem 340 can be multiband and be configured to support multiple frequency bands for a specific communications protocol. In an aspect, modem 340 can be multimode and be configured to support multiple operating networks and communications protocols. In an aspect, modem 340 can control one or more components of UE 104 (e.g., RF front end 388, transceiver 302) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, UE communicating component 342 can optionally include a gap determining component 352 for determining, requesting, receiving information regarding, etc. one or more gaps for measuring self-interference or for allowing a base station or other device to measure self-interference, and/or a self-interference measuring component 354 for measuring self-interference during one or more gaps, in accordance with aspects described herein.

In an aspect, the processor(s) 312 may correspond to one or more of the processors described in connection with the UE in FIG. 11. Similarly, the memory 316 may correspond to the memory described in connection with the UE in FIG. 11.

Figure 4:
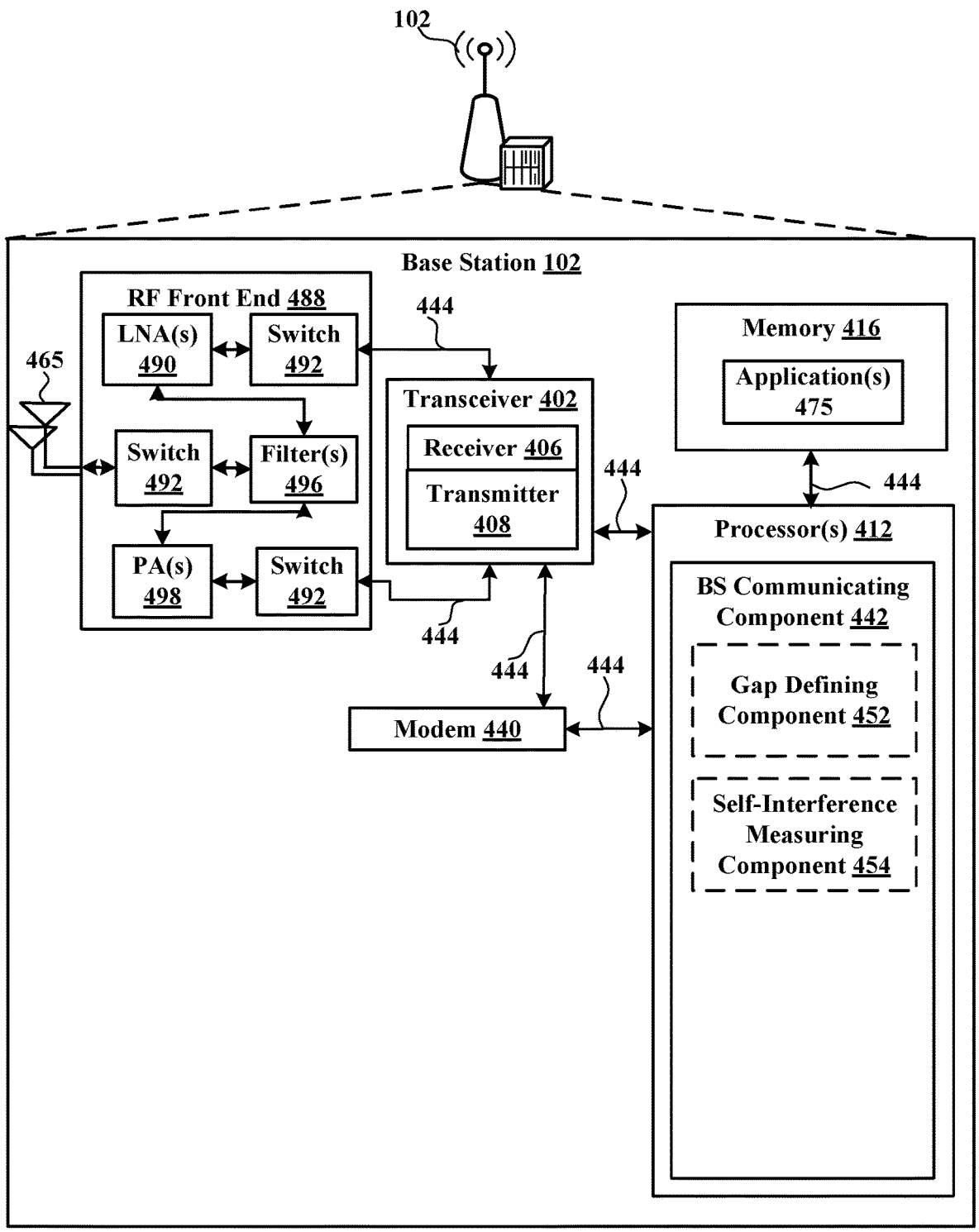
FIG. 4 is a block diagram illustrating an example of a base station, in accordance with various aspects of the present disclosure.

Referring to FIG. 4, one example of an implementation of base station 102 (e.g., a base station 102 and/or gNB 180, as described above) may include a variety of components, some of which have already been described above, but including components such as one or more processors 412 and memory 416 and transceiver 402 in communication via one or more buses 444, which may operate in conjunction with modem 440 and BS communicating component 442 for transmitting gap information and using the gaps to refrain from transmitting communications or measure self-interference, in accordance with aspects described herein.

The transceiver 402, receiver 406, transmitter 408, one or more processors 412, memory 416, applications 475, buses 444, RF front end 488, LNAs 490, switches 492, filters 496, PAs 498, and one or more antennas 465 may be the same as or similar to the corresponding components of UE 104, as described above, but configured or otherwise programmed for base station operations as opposed to UE operations.

In an aspect, BS communicating component 442 can optionally include a gap defining component 452 for defining one or more gaps during which a UE 104 can measure self-interference or during which the base station 102 can measure self-interference, and/or a self-interference measuring component 454 for measuring self-interference during one or more gaps, in accordance with aspects described herein.

In an aspect, the processor(s) 412 may correspond to one or more of the processors described in connection with the base station in FIG. 11. Similarly, the memory 416 may correspond to the memory described in connection with the base station in FIG. 11.

In accordance with aspects described herein, an example of clutter during FD can occur when a transmit beam from a UE 104 is directed at a person but also hits a nearby car. The receive beam at the UE 104 can receive, at the same time, a downlink stream from a base station 102 (e.g., gNB) but also picks up the clutter reflection off the car, causing self-interference. Accordingly, as described, a UE and/or gNB can request and/or assign gaps pattern in transmission, which can be used for clutter model estimation. The gaps can be defined by a time density of gaps, duration of gaps, on-off patters of gaps, etc. In an example, a UE can use gaps to cancel out clutter when using FD. In an example, a gNB can indicate to UE when it is using gaps so UE can correctly decode the downlink. These examples can provide for improved performance when using FD, refrain from wasting resources for unrequired gaps when clutter model is not changing fast, can be used by IAB parent node to configure the IAB node with the desired gaps, etc.

Figure 5:
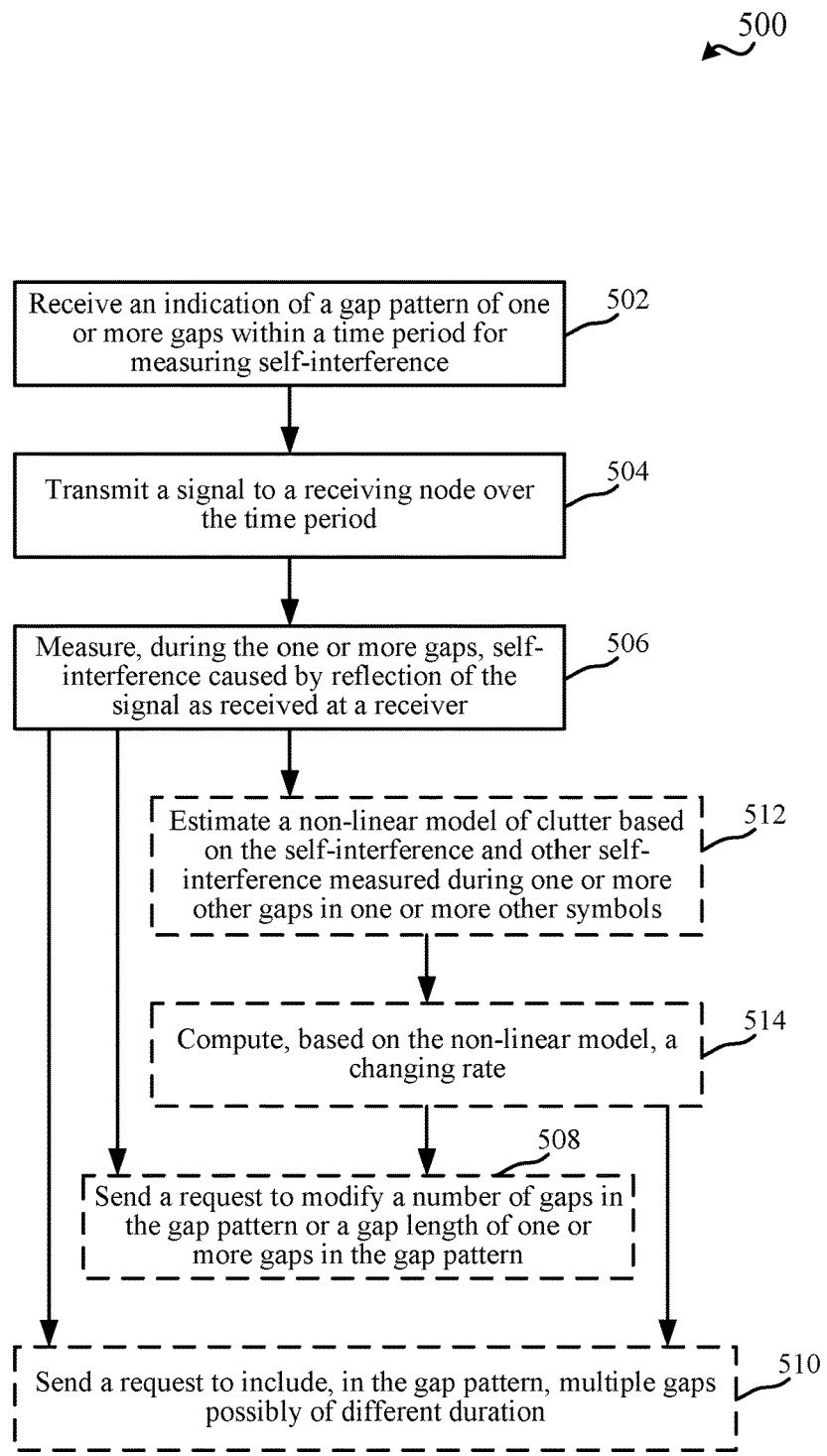
FIG. 5 is a flow chart illustrating an example of a method for measuring self-interference in one or more measurement gaps, in accordance with aspects described herein.
Figure 6:
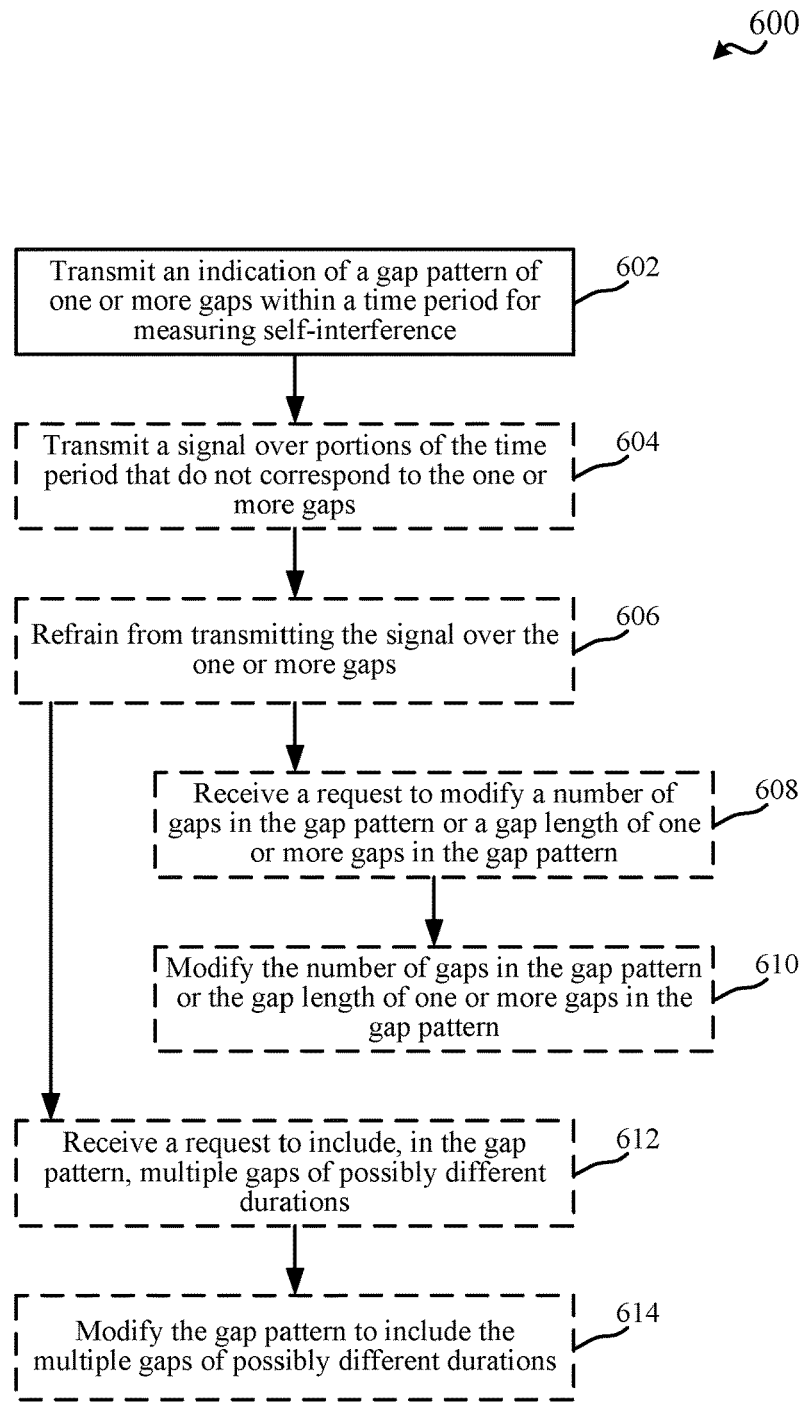
FIG. 6 is a flow chart illustrating an example of a method for configuring one or more measurement gaps for a UE to measure self-interference, in accordance with aspects described herein.

FIG. 5 illustrates a flow chart of an example of a method 500 for measuring self-interference in one or more measurement gaps, in accordance with aspects described herein. FIG. 6 illustrates a flow chart of an example of a method 600 for configuring one or more measurement gaps for a UE to measure self-interference, in accordance with aspects described herein. In an example, a UE 104 can perform the functions described in method 500 using one or more of the components described in FIGS. 1 and 3. In an example, a base station 102 (e.g., a gNB, a monolithic base station, a portion of a disaggregated base station, etc.) can perform the functions described in method 600 using one or more of the components described in FIGS. 1 and 4. Methods 500 and 600 are described in conjunction with one another for ease of explanation; however, the methods 500 and 600 are not required to be performed together and indeed can be performed independently using separate devices.

In method 600, at Block 602, an indication of a gap pattern of one or more gaps within a time period can be transmitted for measuring self-interference. In an aspect, gap defining component 452, e.g., in conjunction with processor(s) 412, memory 416, transceiver 402, BS communicating component 442, etc., can transmit the indication of the gap pattern of one or more gaps within the time period for measuring self-interference. For example, the time period may include a symbol, a slot of symbols, etc., as described above. For example, the gap pattern can be for measuring self-interference that is caused by clutter, as described herein. The gap pattern, in some examples (e.g., an initial gap pattern provided for a given UE 104) can be defined by the base station 102, such that the base station 102 can assign a same or similar gap pattern to UEs without receiving or without considering a priori information about the UEs. In other example, the initial gap pattern can be defined for a class of the UE 104 or other parameter of the UE 104. In any case, gap defining component 452 can transmit the gap pattern to a UE 104 to define gaps for the UE 104 to use in measuring self-interference.

For example, gap defining component 452 can transmit the indication of the gap pattern to the UE 104 in radio resource control (RRC) signaling, media access control (MAC)-control element (CE), downlink control information (DCI, e.g., over a physical downlink control channel (PDCCH), physical downlink shared channel (PDSCH), etc.), and/or the like. In one example, gap defining component 452 can configure the UE 104 with (or otherwise determine) a list of multiple possible gap patterns. In this example, gap defining component 452 may transmit the indication as an identifier or index into the list. As described, the gap may be defined over, or within, a symbol, one or more symbols, etc. An example is shown in FIG. 7.

Figure 7:
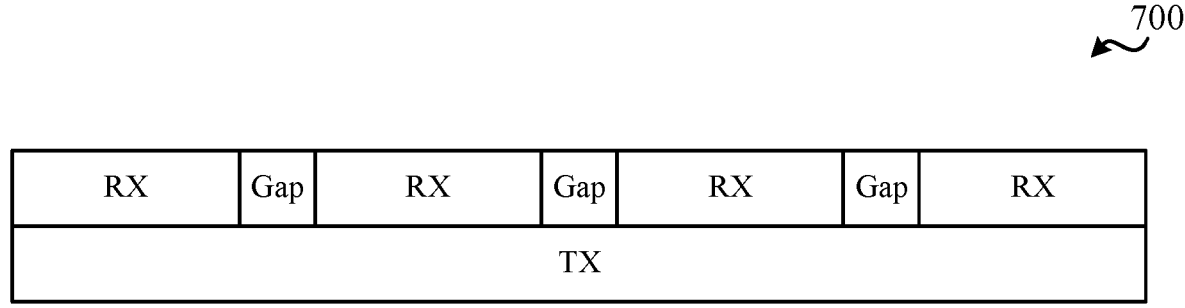
FIG. 7 illustrates an example of a gap pattern defined over a period of time, in accordance with aspects described herein.

FIG. 7 illustrates an example of a gap pattern 700 defined over a period of time, such as a symbol (e.g., an OFDM symbol), a slot of multiple symbols, etc. For example, gap pattern 700 can be defined for a UE 104 capable of FD communications. During the time period, the UE can transmit uplink communications (shown as TX) and can receive communications (shown as RX) with some gaps. During the gaps, the UE 104 can measure self-interference caused by clutter by measuring the transmitted signal as received at the receiver during the gap. In the gap durations, for example, base station or other device defining the gap durations, may not transmit to allow the UE 104 to more accurately measure its self-interference. For example, the gap durations can be portions of a symbol, portions of a slot (e.g., one or more symbols in the slot), etc.

In method 500, at Block 502, an indication of a gap pattern of one or more gaps within a time period can be received for measuring self-interference. In an aspect, gap determining component 352, e.g., in conjunction with processor(s) 312, memory 316, transceiver 302, UE communicating component 342, etc., can receive the indication of the gap pattern of one or more gaps within the time period for measuring self-interference. For example, gap determining component 352 can receive the gap pattern from the base station 102, which may be a gap pattern that define gaps in UE reception (e.g., RX in FIG. 7) during which the base station 102 does not transmit communications. In an example, gap determining component 352 can receive the gap pattern in RRC signaling, MAC-CE, DCI, etc. The gap pattern received by the UE 104, and/or transmitted by the base station 102, can be an initial gap pattern, as described, or an updated gap pattern having modified gaps based on UE request or other considerations, etc., as described further herein. In one example, as described, the UE 104 can be configured with a list of multiple gap patterns. In this example, the indication may include an identifier or index into the list of gap patterns. In another example, the gap pattern may define during which the UE can also refrain from transmitting to measure reflected signal energy from a portion of the transmission occurring before the gap.

In method 600, optionally at Block 604, a signal can be transmitted over portions of the time period that do not correspond to the one or more gaps. In an aspect, BS communicating component 442, e.g., in conjunction with processor(s) 412, memory 416, transceiver 402, etc., can transmit the signal over portions of the time period that do not correspond to the one or more gaps. In method 600, optionally at Block 606, transmitting the signal can be refrained from over the one or more gaps. In an aspect, BS communicating component 442, e.g., in conjunction with processor(s) 412, memory 416, transceiver 402, etc., can refrain from transmitting the signal over the one or more gaps. For example, referring to the gap pattern 700 in FIG. 7, BS communicating component 442 can transmit the signal (e.g., a downlink signal to the UE 104 or another signal) in the RX durations while refraining from transmitting in the gap durations, though the base station 102 may not be required to refrain from transmitting during the gaps in this example.

In method 500, at Block 504, a signal can be transmitted to a receiving node over the time period. In an aspect, UE communicating component 342, e.g., in conjunction with processor(s) 312, memory 316, transceiver 302, etc., can transmit the signal to the receiving node over the time period. For example, UE communicating component 342 can transmit the signal to the base station 102 or another receiving node. In method 500, at Block 506, self-interference caused by reflection of the signal as received at a receiver can be measured during the one or more gaps. In an aspect, self-interference measuring component 354, e.g., in conjunction with processor(s) 312, memory 316, transceiver 302, UE communicating component 342, etc., can measure, during the one or more gaps, self-interference caused by reflection of the signal as received at the receiver (e.g., a receiver of the UE, such as transceiver 302 or a portion thereof). For example, as UE communicating component 342 transmits the signal over the time period, self-interference measuring component 354 can measure the signal at the receiver of the UE 104 during the gaps free from interference from the base station 102 to detect self-interference that may be caused by clutter.

In another example, as described, UE communicating component 342 can transmit the signal in the time period while refraining from transmitting during the gaps in the time period. For example, the interference caused by reflection of the transmitted signal may be received in a slightly later time period (e.g., a portion of the symbol after transmitting the signal), and thus measuring the received signal during the time period, but in a portion of the time period during which the UE 104 does not transmit, can allow for more accurate estimation of clutter. UE communicating component 342 can then cancel this self-interference from subsequent signals received at the UE 104 while transmitting the other signals in FD.

In method 500, optionally at Block 508, a request to modify a number of gaps in the gap pattern or a gap length of one or more gaps in the gap pattern can be sent. In an aspect, gap determining component 352, e.g., in conjunction with processor(s) 312, memory 316, transceiver 302, UE communicating component 342, etc., can send a request to modify the number of gaps in the gap pattern or the gap length of one or more gaps in the gap pattern. For example, gap determining component 352 can transmit the request to the base station 102 based on one or more properties of the measured self-interference, or based an estimated clutter model, as described further herein. For example, the request can indicate to add more gaps or to allow a longer gap length to allow for more frequent or longer time for more accurate self-interference measurement over time. In another example, the request can indicate to remove gaps or shorten gap times where more frequent self-interference measurement is not needed (and thus radio resources can be conserved for receiving data signals), etc. For example, gap determining component 352 can transmit the request to the base station 102 in uplink control information (UCI, e.g. over a physical uplink control channel (PUCCH), physical uplink shared channel (PUSCH), etc.) or other signaling (e.g., RRC signaling, etc.).

In method 600, optionally at Block 608, a request to modify a number of gaps in the gap pattern or a gap length of one or more gaps in the gap pattern can be received. In an aspect, gap defining component 452, e.g., in conjunction with processor(s) 412, memory 416, transceiver 402, BS communicating component 442, etc., can receive the request to modify the number of gaps in the gap pattern or the gap length of the one or more gaps in the gap pattern (e.g., in UCI or other signaling from the UE). For example, the request can indicate the number of gaps (e.g., number of gaps per symbol, or number of gaps per slot, etc.), the desired length of one or more gaps (e.g., number of symbol portions of a symbol, or number of symbols of a slot, etc.), an indication of each gap and desired duration, and/or the like.

In method 600, optionally at Block 610, the number of gaps in the gap pattern or the gap length of one or more gaps in the gap pattern can be modified. In an aspect, gap defining component 452, e.g., in conjunction with processor(s) 412, memory 416, transceiver 402, BS communicating component 442, etc., can modify (e.g., based on the request) the number of gaps in the gap pattern or the gap length of one or more gaps in the gap pattern. In an example, this can include gap defining component 452 indicating the modification to the UE 104 (e.g., by transmitting an indication of the gap pattern at Block 602), so the UE 104 can subsequently use the modified gap pattern to perform self-interference measurements.

In method 500, optionally at Block 510, a request can be sent to include, in the gap pattern, multiple gaps possibly of different durations In an aspect, gap determining component 352, e.g., in conjunction with processor(s) 312, memory 316, transceiver 302, UE communicating component 342, etc., can send a request to include, in the gap pattern, multiple gaps possibly of different duration. For example, gap determining component 352 can transmit the request to the base station 102 based on one or more properties of the measured self-interference, or based an estimated clutter model, as described further herein. For example, the request can indicate to include one gap of a longer duration to facilitate measuring longer distance clutter (e.g., reflection off of objects that are further away and thus may result in a longer propagation delay for the reflected signal).

In method 600, optionally at Block 612, a request to include, in the gap pattern, multiple gaps of possibly different durations can be received. In an aspect, gap defining component 452, e.g., in conjunction with processor(s) 412, memory 416, transceiver 402, BS communicating component 442, etc., can receive (e.g., from UE 104) a request to include, in the gap pattern, multiple gaps of possibly different duration. For example, the request can indicate a desired duration of at least one of the gaps, a request for a longer gap to allow for modeling longer distance clutter, and/or the like.

In method 600, optionally at Block 614, the gap pattern can be modified to include the multiple gaps of possibly different duration. In an aspect, gap defining component 452, e.g., in conjunction with processor(s) 412, memory 416, transceiver 402, BS communicating component 442, etc., can modify (e.g., based on the request) the gap pattern to include the multiple gaps of possibly different durations. In an example, this can include gap defining component 452 indicating the modification to the UE 104 (e.g., by transmitting an indication of the gap pattern at Block 602), so the UE 104 can subsequently use the modified gap pattern to perform self-interference measurements. In some examples, the multiple gaps may be of a certain set length, such as a regular gap or longer gap. For example, the gap length can be of sufficient duration to cover the channel response of the clutter. In one example, the gap length can be relative to a cyclic prefix (CP) of signal transmissions (e.g., signals transmitted by the UE to measure self-interference). In one specific non-limiting example, a regular gap length may be defined as 10% of the CP and a longer gap can be defined as 30% of the CP. In an example, gap defining component 452 can initially define a gap pattern of regular gaps, and then may vary the number of longer gaps within the gap pattern depending one or more observed parameters, such as time mobility (e.g., mobility of a UE over time).

For example, gap defining component 452 can determine and evaluate the mobility of the UEs. Where mobility of one or more UEs achieve a threshold, for example, gap defining component 452 can configure additional longer gaps in the gap pattern, whereas where the one or more UEs are more static, gap defining component 452 may configure a less number of longer gaps in the gap pattern. In addition, for example, longer distance clutter may be of less significance to self-interference measurement and cancellation, and thus may use less tight tracking.

As described, in one example, requesting gap pattern modification can be based on modeling clutter over a period of time. For example, in method 500, optionally at Block 512, a non-linear model of clutter can be estimated based on the self-interference and other self-interference measured during one or more other gaps in one or more other symbols. In an aspect, self-interference measuring component 354, e.g., in conjunction with processor(s) 312, memory 316, transceiver 302, UE communicating component 342, etc., can estimate the non-linear model of clutter based on the self-interference and other self-interference measured during one or more other gaps in one or more other symbols. For example, self-interference measuring component 354 can measure the self-interference over multiple symbols and/or multiple gaps based on one or more gap patterns, etc., as described herein. Self-interference measuring component 354 can model the self-interference caused by clutter over the period of time.

In method 500, optionally at Block 514, a changing rate can be computed based on the non-linear model. In an aspect, self-interference measuring component 354, e.g., in conjunction with processor(s) 312, memory 316, transceiver 302, UE communicating component 342, etc., can compute, based on the non-linear model, the changing rate. For example, self-interference measuring component 354 can estimate the model changing rate by observing how the model of self-interference caused by clutter changes over a period of time. For example, the changing rate can represent a clutter channel response over time. In an example, self-interference measuring component 354 can request changes to the gap pattern based on this changing rate, which can improve gap usage by requesting additional gaps or gap length where the channel changes more frequently.

Figure 8:
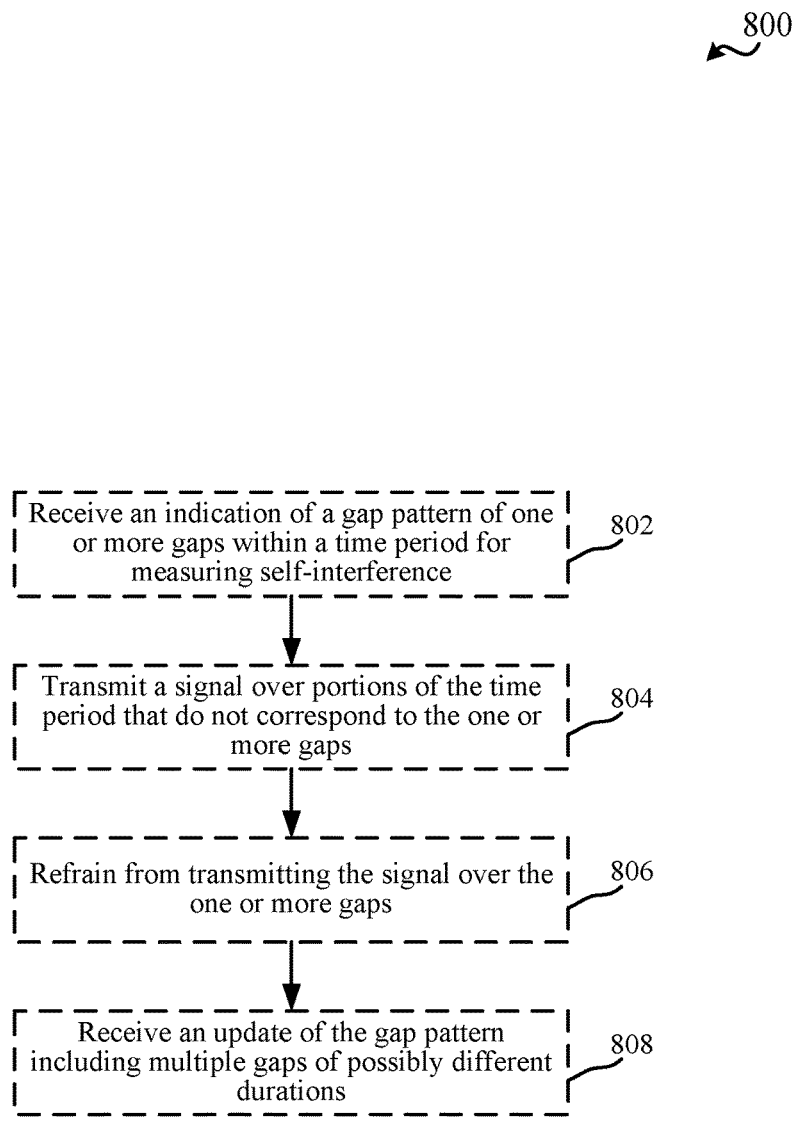
FIG. 8 is a flow chart illustrating an example of a method for refraining from transmitting in one or more measurement gaps, in accordance with aspects described herein.
Figure 9:
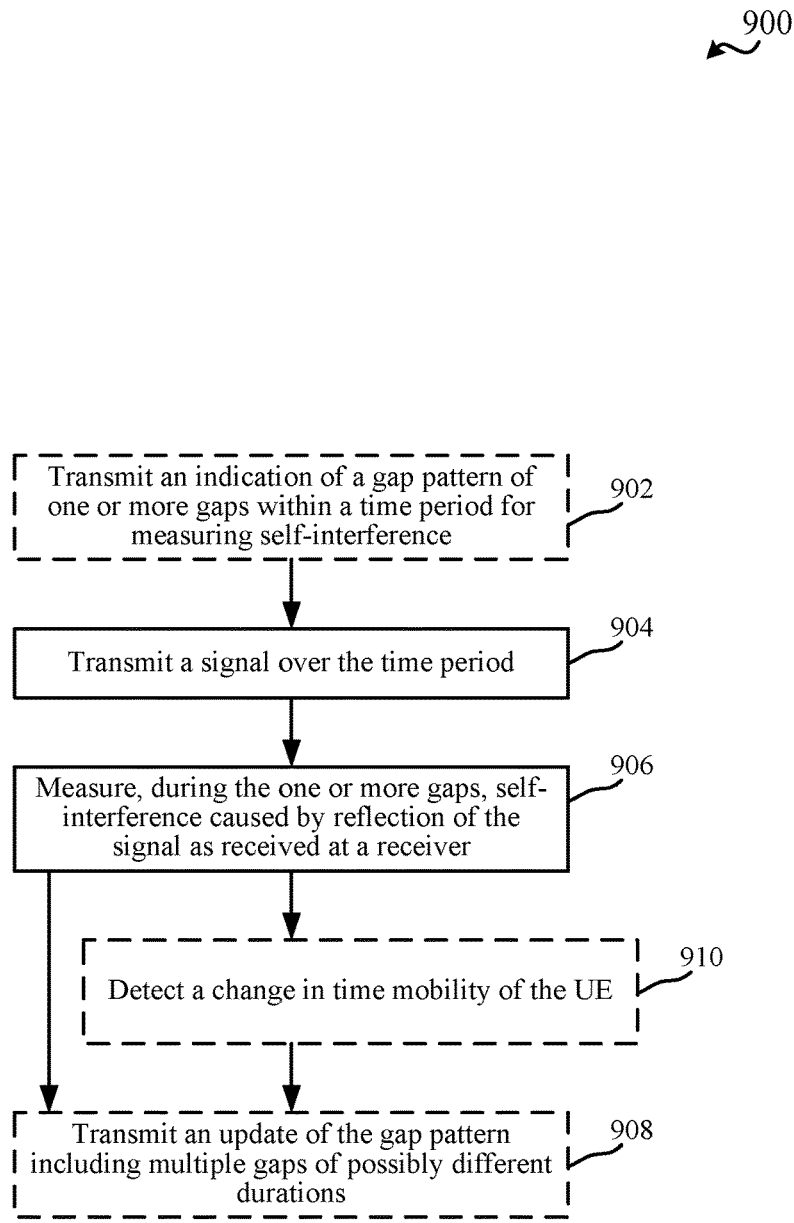
FIG. 9 is a flow chart illustrating an example of a method for measuring self-interference in one or more configured measurement gaps, in accordance with aspects described herein.

FIG. 8 illustrates a flow chart of an example of a method 800 for refraining from transmitting in one or more measurement gaps, in accordance with aspects described herein. FIG. 9 illustrates a flow chart of an example of a method 900 for measuring self-interference in one or more configured measurement gaps, in accordance with aspects described herein. In an example, a UE 104 can perform the functions described in method 800 using one or more of the components described in FIGS. 1 and 3. In an example, a base station 102 (e.g., a gNB, a monolithic base station, a portion of a disaggregated base station, etc.) can perform the functions described in method 900 using one or more of the components described in FIGS. 1 and 4. Methods 800 and 900 are described in conjunction with one another for ease of explanation; however, the methods 800 and 900 are not required to be performed together and indeed can be performed independently using separate devices.

In method 900, optionally at Block 902, an indication of a gap pattern of one or more gaps within a time period can be transmitted for measuring self-interference. In an aspect, gap defining component 452, e.g., in conjunction with processor(s) 412, memory 416, transceiver 402, BS communicating component 442, etc., can transmit the indication of the gap pattern of one or more gaps within the time period for measuring self-interference. For example, the time period can include a symbol, a slot of multiple symbols, etc. For example, the gap pattern can be for measuring self-interference at the base station 102, where the self-interference may be caused by clutter, as described herein. Thus, in this example, the gap pattern can define the one or more gaps during which the base station 102 refrains from transmitting, or during which the UE 104 is to refrain from transmitting communications, to allow the base station 102 to measure its self-interference. The gap pattern, in some examples (e.g., an initial gap pattern provided for a given UE 104) can be defined by the base station 102, such that the base station 102 can assign a same or similar gap pattern to UEs without receiving or without considering a priori information about the UEs. In other example, the initial gap pattern can be defined for a class of the UE 104 or other parameter of the UE 104. In any case, gap defining component 452 can transmit the gap pattern to a UE 104 to define gaps for the UE 104 to refrain from transmitting communications. For example, gap defining component 452 can transmit the indication of the gap pattern to the UE 104 in RRC signaling, MAC-CE, DCI, etc. As described, the gap may be defined over, or within, a symbol, one or more symbols within a slot, etc. An example is shown in FIG. 10.

Figure 10:
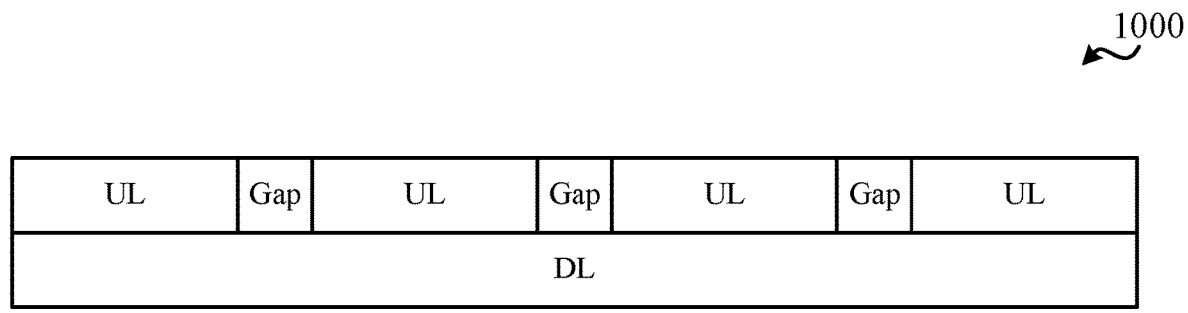
FIG. 10 illustrates an example of a gap pattern defined over a period of time, in accordance with aspects described herein.

FIG. 10 illustrates an example of a gap pattern 1000 defined over a period of time, such as a symbol (e.g., an OFDM symbol). For example, gap pattern 1000 can be defined by a base station 102 capable of FD communications. During the time period, the base station 102 can transmit downlink communications (shown as DL) and can receive uplink communications (shown as UL) from one or more UEs with some gaps. During the gaps, the base station 102 measure self-interference caused by clutter by measuring the transmitted signal as received at the receiver during the gap. In the gap durations, for example, the UEs may not transmit to allow the base station 102 to more accurately measure its self-interference. For example, the gap durations can be portions of a symbol, portions of a slot (e.g., one or more symbols in the slot), etc.

In method 800, optionally at Block 802, an indication of a gap pattern of one or more gaps within a time period can be received for measuring self-interference. In an aspect, gap determining component 352, e.g., in conjunction with processor(s) 312, memory 316, transceiver 302, UE communicating component 342, etc., can receive the indication of the gap pattern of one or more gaps within the time period for measuring self-interference. For example, gap determining component 352 can receive the gap pattern from the base station 102, which may be a gap pattern that define gaps in UE transmission (e.g., UL in FIG. 10) during which the UE 104 is to refrain from transmitting communications. In an example, gap determining component 352 can receive the gap pattern in RRC signaling, MAC-CE, DCI, etc. The gap pattern received by the UE 104, and/or transmitted by the base station 102, can be an initial gap pattern, as described, or an updated gap pattern having modified gaps based on UE request or other considerations, etc., as described further herein. In one example, the indication of the gap pattern may include on-off times for the UE 104, and the UE 104 can accordingly turn receiving circuitry on or off based on the on-off times (e.g., during a symbol).

In method 800, at Block 804, a signal can be transmitted over portions of the time period that do not correspond to the one or more gaps. In an aspect, UE communicating component 342, e.g., in conjunction with processor(s) 312, memory 316, transceiver 302, etc., can transmit the signal over portions of the time period that do not correspond to the one or more gaps. In method 800, at Block 806, transmitting the signal can be refrained from over the one or more gaps. In an aspect, UE communicating component 342, e.g., in conjunction with processor(s) 312, memory 316, transceiver 302, etc., can refrain from transmitting the signal over the one or more gaps. For example, referring to the gap pattern 1000 in FIG. 10, UE communicating component 342 can transmit the signal (e.g., an uplink signal to the base station 102 or another base station) in the UL durations while refraining from transmitting in the gap durations though the UE 104 may not be required to refrain from transmitting during the gaps in this example.

In method 900, at Block 904, a signal can be transmitted over the time period. In an aspect, BS communicating component 442, e.g., in conjunction with processor(s) 412, memory 416, transceiver 402, etc., can transmit the signal (e.g., to the UE 104 or other device) over the time period. In method 900, at Block 906, self-interference caused by reflection of the signal as received at a receiver can be measured during the one or more gaps. In an aspect, self-interference measuring component 454, e.g., in conjunction with processor(s) 412, memory 416, transceiver 402, BS communicating component 442, etc., can measure, during the one or more gaps, self-interference caused by reflection of the signal as received at the receiver (e.g., a receiver of the base station 102, such as transceiver 402 or a portion thereof). For example, as BS communicating component 442 transmits the signal over the time period, self-interference measuring component 454 can measure the signal at the receiver of the base station 102 during the gaps free from interference from uplink transmissions by one or more UEs 104 to detect self-interference that may be caused by clutter.

In another example, BS communicating component 442 can transmit the signal in the time period while refraining from transmitting during the gaps in the time period. For example, the interference caused by reflection of the transmitted signal may be received in a slightly later time period (e.g., a portion of the symbol after transmitting the signal), and thus measuring the received signal during the time period, but in a portion of the time period during which the base station 102 does not transmit, can allow for more accurate estimation of clutter. BS communicating component 442 can then cancel this self-interference from subsequent signals received at the base station 102 while transmitting the other signals in FD. Moreover, as described, self-interference measuring component 454 can estimate a non-linear model of clutter based on the self-interference measurements over a period of time, and may use this model for cancelling interference, for determining to modify the gap pattern or duration of gaps, etc., as described herein.

In method 900, optionally at Block 908, an update of the gap pattern including multiple gaps of possibly different duration can be transmitted. In an aspect, gap defining component 452, e.g., in conjunction with processor(s) 412, memory 416, transceiver 402, BS communicating component 442, etc., can transmit an update of the gap pattern including multiple gaps of possibly different durations. For example, the update can indicate the multiple gaps including a starting time (e.g., within a symbol), a duration, and/or the like. In an example, gap defining component 452 can determine the update to include additional or less time for gaps, which may be based on evaluating the change in self-interference over time, or one or more parameters that may be indicative of how the self-interference may change over time.

In one example, in method 900 at Block 910, a change in time mobility of a UE can be detected. In an aspect, gap defining component 452, e.g., in conjunction with processor(s) 412, memory 416, transceiver 402, BS communicating component 442, etc., can detect the change in time mobility of the UE. For example, gap defining component 452 can determine and evaluate the mobility of the UEs. Where mobility of one or more UEs achieve a threshold, for example, gap defining component 452 can configure additional longer gaps in the gap pattern (and/or less regular gaps), whereas where the one or more UEs are more static, gap defining component 452 may configure a less number of longer gaps in the gap pattern (and/or more regular gaps). As described, for example, the gap length can be of sufficient duration to cover the channel response of the clutter. In one example, the gap length can be relative to a CP of signal transmissions (e.g., signals transmitted by the network node to measure self-interference). In one specific non-limiting example, a regular gap length may be defined as 10% of the CP and a longer gap can be defined as 30% of the CP. In addition, for example, longer distance clutter may be of less significance to self-interference measurement and cancellation, and thus may use less tight tracking.

In method 800, optionally at Block 808, an update of the gap pattern including multiple gaps of possibly different duration can be received. In an aspect, gap determining component 352, e.g., in conjunction with processor(s) 312, memory 316, transceiver 302, UE communicating component 342, etc., can receive the update of the gap pattern including multiple gaps of possibly different durations. Gap determining component 352 can apply the update to the gap pattern in refraining from transmitting uplink communications in subsequent time periods (e.g., in a portion of a subsequent symbol).

Figure 11:
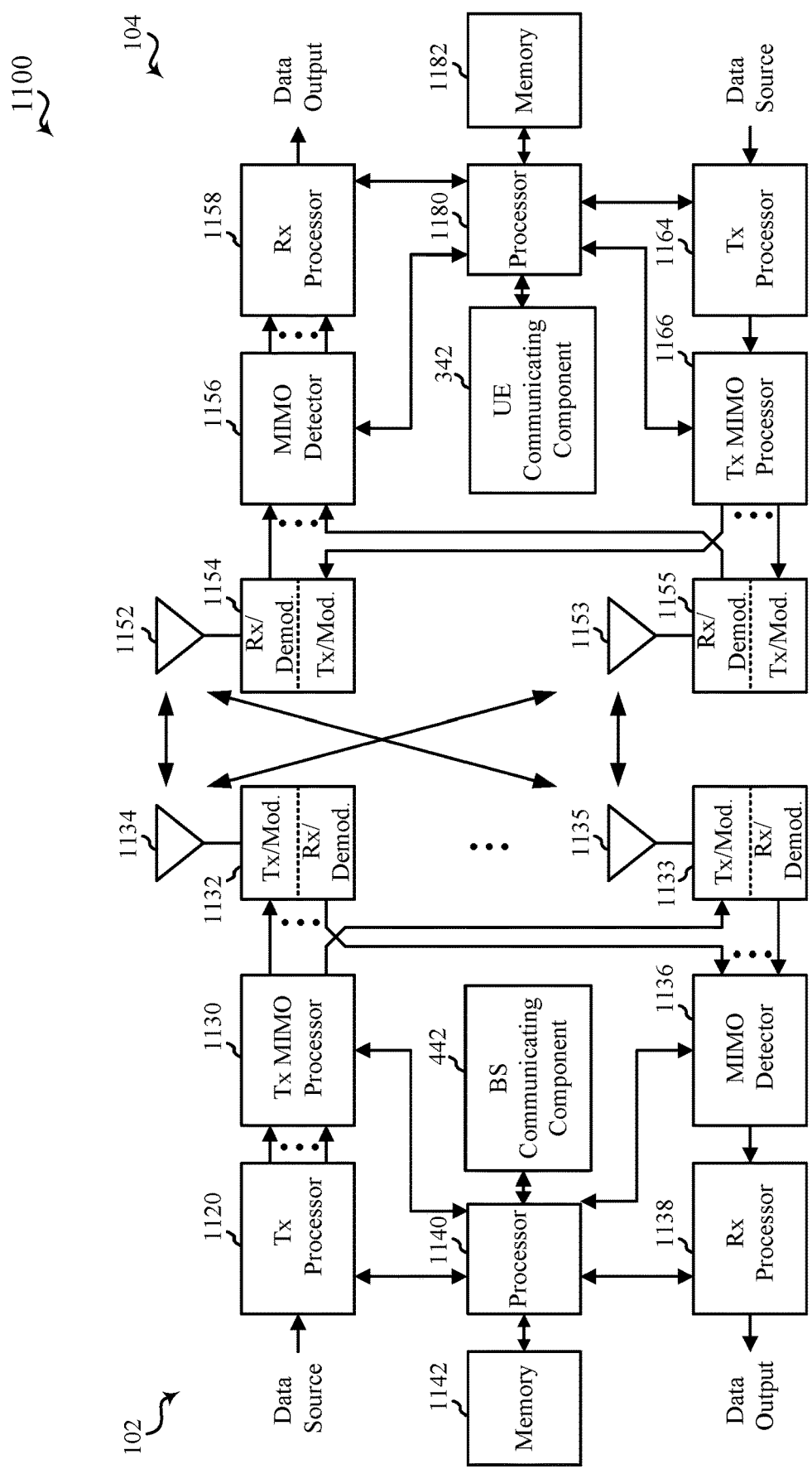
FIG. 11 is a block diagram illustrating an example of a multiple-input multiple-output (MIMO) communication system including a base station and a UE, in accordance with various aspects of the present disclosure.

FIG. 11 is a block diagram of a MIMO communication system 1100 including a base station 102 and a UE 104. The MIMO communication system 1100 may illustrate aspects of the wireless communication access network 100 described with reference to FIG. 1. The base station 102 may be an example of aspects of the base station 102 described with reference to FIG. 1. The base station 102 may be equipped with antennas 1134 and 1135, and the UE 104 may be equipped with antennas 1152 and 1153. In the MIMO communication system 1100, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 1120 may receive data from a data source. The transmit processor 1120 may process the data. The transmit processor 1120 may also generate control symbols or reference symbols. A transmit MIMO processor 1130 may perform spatial processing (e.g., precoding) on data symbols, control symbols, or reference symbols, if applicable, and may provide output symbol streams to the transmit modulator/demodulators 1132 and 1133. Each modulator/demodulator 1132 through 1133 may process a respective output symbol stream (e.g., for OFDM, etc.) to obtain an output sample stream. Each modulator/demodulator 1132 through 1133 may further process (e.g., convert to analog, amplify, filter, and upconvert) the output sample stream to obtain a DL signal. In one example, DL signals from modulator/demodulators 1132 and 1133 may be transmitted via the antennas 1134 and 1135, respectively.

The UE 104 may be an example of aspects of the UEs 104 described with reference to FIGS. 1 and 3. At the UE 104, the UE antennas 1152 and 1153 may receive the DL signals from the base station 102 and may provide the received signals to the modulator/demodulators 1154 and 1155, respectively. Each modulator/demodulator 1154 through 1155 may condition (e.g., filter, amplify, downconvert, and digitize) a respective received signal to obtain input samples. Each modulator/demodulator 1154 through 1155 may further process the input samples (e.g., for OFDM, etc.) to obtain received symbols. A MIMO detector 1156 may obtain received symbols from the modulator/demodulators 1154 and 1155, perform MIMO detection on the received symbols, if applicable, and provide detected symbols. A receive (Rx) processor 1158 may process (e.g., demodulate, deinterleave, and decode) the detected symbols, providing decoded data for the UE 104 to a data output, and provide decoded control information to a processor 1180, or memory 1182.

The processor 1180 may in some cases execute stored instructions to instantiate a UE communicating component 342 (see e.g., FIGS. 1 and 3).

On the uplink (UL), at the UE 104, a transmit processor 1164 may receive and process data from a data source. The transmit processor 1164 may also generate reference symbols for a reference signal. The symbols from the transmit processor 1164 may be precoded by a transmit MIMO processor 1166 if applicable, further processed by the modulator/demodulators 1154 and 1155 (e.g., for single carrier-FDMA, etc.), and be transmitted to the base station 102 in accordance with the communication parameters received from the base station 102. At the base station 102, the UL signals from the UE 104 may be received by the antennas 1134 and 1135, processed by the modulator/demodulators 1132 and 1133, detected by a MIMO detector 1136 if applicable, and further processed by a receive processor 1138. The receive processor 1138 may provide decoded data to a data output and to the processor 1140 or memory 1142.

The processor 1140 may in some cases execute stored instructions to instantiate a BS communicating component 442 (see e.g., FIGS. 1 and 4).

The components of the UE 104 may, individually or collectively, be implemented with one or more ASICs adapted to perform some or all of the applicable functions in hardware. Each of the noted modules may be a means for performing one or more functions related to operation of the MIMO communication system 1100. Similarly, the components of the base station 102 may, individually or collectively, be implemented with one or more application specific integrated circuits (ASICs) adapted to perform some or all of the applicable functions in hardware. Each of the noted components may be a means for performing one or more functions related to operation of the MIMO communication system 1100.

The following aspects are illustrative only and aspects thereof may be combined with aspects of other embodiments or teaching described herein, without limitation.

Aspect 1 is a method for wireless communication at a UE including receiving, from a network node, an indication of a gap pattern of one or more gaps within a time period for measuring self-interference due to clutter, transmitting a signal to a receiving node over the time period, and measuring, during the one or more gaps, self-interference caused by reflection of the signal as received at a receiver of the UE.

In Aspect 2, the method of Aspect 1 includes where the gap pattern specifies the one or more gaps as gaps of the time period during which at least one of the network node or the UE does not transmit signals.

In Aspect 3, the method of any of Aspects 1 or 2 includes estimating a non-linear model of the clutter based on the self-interference and other self-interference measured during one or more other gaps in one or more other time periods.

In Aspect 4, the method of Aspect 3 includes computing, based on the non-linear model, a changing rate, and sending, to the network node, a request to modify a number of gaps in the gap pattern based on the changing rate.

In Aspect 5, the method of Aspect 4 includes where sending the request includes sending the request in a PUCCH, PUSCH, or MAC-CE.

In Aspect 6, the method of any of Aspects 1 to 5 includes sending, to the network node, a request to modify a gap length of the one or more gaps in the gap pattern based on a channel response corresponding to the self-interference.

In Aspect 7, the method of Aspect 6 includes where sending the request includes sending the request in a PUCCH, PUSCH, or MAC-CE.

In Aspect 8, the method of any of Aspects 1 to 7 includes sending, to the network node, a request to include, in the gap pattern, multiple gaps where at least one gap of the multiple gaps has a different duration than at least one other gap of the multiple gaps.

In Aspect 9, the method of Aspect 8 includes where the request indicates at least one duration of at least one gap, where the at least one duration is based on time mobility of the UE.

In Aspect 10, the method of Aspect 9 includes where sending the request includes sending the request in a PUCCH, PUSCH, or MAC-CE.

In Aspect 11, the method of any of Aspects 1 to 10 includes where receiving the indication of the gap pattern includes receiving, in RRC signaling, a MAC-CE, or DCI, a configuration including the indication of the gap pattern.

In Aspect 12, the method of any of Aspects 1 to 11 includes where the time period is a symbol.

Aspect 13 is a method for wireless communication at a network node including transmitting, for a UE, an indication of a gap pattern of one or more gaps within a time period for measuring self-interference due to clutter, transmitting a signal to the UE over periods of the time period that do not correspond to the one or more gaps, and refraining from transmitting the signal to the UE over the one or more gaps.

In Aspect 14, the method of Aspect 13 includes receiving, from the UE, a request to modify a number of gaps in the gap pattern, and modifying the number of gaps in the gap pattern based on the request.

In Aspect 15, the method of Aspect 14 includes where the request is received in a PUCCH, PUSCH, or MAC-CE.

In Aspect 16, the method of any of Aspects 13 to 15 includes receiving, from the UE, a request to modify a gap length of the one or more gaps in the gap pattern, and modifying the gap length of the one or more gaps in the gap pattern based on the request.

In Aspect 17, the method of Aspect 16 includes where the request is received in a PUCCH, PUSCH, or MAC-CE.

In Aspect 18, the method of any of Aspects 13 to 17 includes receiving, from the UE, a request to include, in the gap pattern, multiple gaps where at least one gap of the multiple gaps has a different duration than at least one other gap of the multiple gaps, and modifying the gap pattern to include the multiple gaps where the at least one gap has a different duration than the at least one other gap.

In Aspect 19, the method of any of Aspects 13 to 18 includes where transmitting the indication of the gap pattern includes transmitting, in RRC signaling, a MAC-CE, or DCI, a configuration including the indication of the gap pattern.

In Aspect 20, the method of any of Aspects 13 to 19 includes where the time period is a symbol.

Aspect 21 is a method for wireless communication at a UE including receiving, from a network node, an indication of a gap pattern of one or more gaps within a time period for measuring self-interference due to clutter, transmitting a signal to the network node over periods of the time period that do not correspond to the one or more gaps, and refraining from transmitting the signal to the network node over the one or more gaps.

In Aspect 22, the method of Aspect 21 includes where the indication is received in one of DCI, MAC-CE, or RRC signaling.

In Aspect 23, the method of any of Aspects 21 or 22 includes where the UE stores, in a memory, a list of gap patterns and associated identifiers, and further comprising obtaining the gap pattern from the list of gap patterns based on an identifier of the gap pattern specified in the indication.

In Aspect 24, the method of any of Aspects 21 to 23 includes receiving, from the network node, an update of the gap pattern including multiple gaps where at least one gap of the multiple gaps has a different duration than at least one other gap of the multiple gaps.

In Aspect 25, the method of any of Aspects 21 to 24 includes where the time period is a symbol.

Aspect 26 is a method for wireless communication at a network node including transmitting, to a UE, an indication of a gap pattern of one or more gaps within a time period for measuring self-interference due to clutter, transmitting a signal to a receiving node over the time period, and measuring, during the one or more gaps, self-interference caused by reflection of the signal as received at a receiver of the network node.

In Aspect 27, the method of Aspect 26 includes where the gap pattern specifies the one or more gaps as gaps of the time period during which at least one of the network node or the UE does not transmit signals.

In Aspect 28, the method of any of Aspects 26 or 27 includes where the indication is transmitted in one of DCI, MAC-CE, or RRC signaling.

In Aspect 29, the method of any of Aspects 26 to 28 includes where the indication specifies an identifier of the gap pattern to enable the UE to obtain the gap pattern from a stored list of gap patterns.

In Aspect 30, the method of any of Aspects 26 to 29 includes transmitting, to the UE, an update of the gap pattern including multiple gaps where at least one gap of the multiple gaps has a different duration than at least one other gap of the multiple gaps.

In Aspect 31, the method of Aspect 30 includes detecting a change in time mobility of the UE, where updating the gap pattern is based on the change in time mobility.

In Aspect 32, the method of any of Aspects 26 to 31 includes where the time period is a symbol.

Aspect 33 is an apparatus for wireless communication including a processor, memory coupled with the processor, and instructions stored in the memory and operable, when executed by the processor, to cause the apparatus to perform any of the methods of Aspects 1 to 32.

Aspect 34 is an apparatus for wireless communication including means for performing any of the methods of Aspects 1 to 32.

Aspect 35 is a computer-readable medium including code executable by one or more processors for wireless communications, the code including code for performing any of the methods of Aspects 1 to 32.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially programmed device, such as but not limited to a processor, a digital signal processor (DSP), an ASIC, a field programmable gate array (FPGA) or other programmable logic device, a discrete gate or transistor logic, a discrete hardware component, or any combination thereof designed to perform the functions described herein. A specially programmed processor may be a microprocessor, but in the alternative, the processor may be any conventional processor, controller, microcontroller, or state machine. A specially programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. An apparatus for wireless communication, comprising:
a processor;
a memory coupled with the processor; and
instructions stored in the memory and operable, when executed by the processor, to cause the apparatus to:
receive, from a network node that provides an access point for the apparatus, an indication of a gap pattern of one or more gaps within a time period;
transmit a signal to a receiving node in the time period;
measure, during the one or more gaps, self-interference caused by reflection of the signal as received at a receiver of the apparatus; and
send, in an uplink channel to the network node and based on the self-interference, a request to modify the gap pattern.

2. The apparatus of claim 1, wherein the gap pattern specifies the one or more gaps as gaps of the time period during which at least one of the network node or the apparatus does not transmit signals.

3. The apparatus of claim 1, wherein the instructions, when executed by the processor, cause the apparatus to estimate a non-linear model of clutter based on the self-interference and other self-interference measured during one or more other gaps in one or more other time periods.

4. The apparatus of claim 3, wherein the instructions, when executed by the processor, cause the apparatus to:
compute, based on the non-linear model, a changing rate, wherein the request to modify the gap pattern includes a request to modify a number of gaps in the gap pattern based on the changing rate.

5. The apparatus of claim 4, wherein the instructions, when executed by the processor, cause the apparatus to send the request in the uplink channel including sending the request in a physical uplink control channel (PUCCH), or a physical uplink shared channel (PUSCH), or as a media access control (MAC)-control element (CE).

6. The apparatus of claim 1, wherein the request to modify the gap pattern includes a request to modify a gap length of the one or more gaps in the gap pattern based on a channel response corresponding to the self-interference.

7. The apparatus of claim 6, wherein the instructions, when executed by the processor, cause the apparatus to send the request in the uplink channel including sending the request in a physical uplink control channel (PUCCH), or a physical uplink shared channel (PUSCH), or as a media access control (MAC)-control element (CE).

8. The apparatus of claim 1, wherein the request to modify the gap pattern includes a request to include, in the gap pattern, multiple gaps where at least one gap of the multiple gaps has a different duration than at least one other gap of the multiple gaps.

9. The apparatus of claim 8, wherein the request indicates at least one duration of at least one gap, wherein the at least one duration is based on time mobility of the apparatus.

10. The apparatus of claim 9, wherein the instructions, when executed by the processor, cause the apparatus to send the request in the uplink channel including sending the request in a physical uplink control channel (PUCCH), or a physical uplink shared channel (PUSCH), or as a media access control (MAC)-control element (CE).

11. The apparatus of claim 1, wherein the instructions, when executed by the processor, cause the apparatus to receive the indication of the gap pattern in radio resource control (RRC) signaling, a media access control (MAC)-control element (CE), or downlink control information (DCI).

12. The apparatus of claim 1, wherein the time period is a symbol.

13. An apparatus for wireless communication, comprising:
a processor;
a memory coupled with the processor; and
instructions stored in the memory and operable, when executed by the processor, to cause the apparatus to:
transmit, for a user equipment (UE) for which the apparatus provides an access point, an indication of a gap pattern of one or more gaps within a time period;
transmit a signal to the UE in periods of the time period that do not correspond to the one or more gaps;
refrain from transmitting the signal to the UE in the one or more gaps; and
receive, in an uplink channel from the UE and based on self-interference, a request to modify the gap pattern.

14. The apparatus of claim 13, wherein the request to modify the gap pattern includes a request to modify a number of gaps in the gap pattern, and wherein the instructions, when executed by the processor, cause the apparatus to:
modify the number of gaps in the gap pattern based on the request.

15. The apparatus of claim 14, wherein the instructions, when executed by the processor, cause the apparatus to receive the request in the uplink channel including receiving the request in a physical uplink control channel (PUCCH), or a physical uplink shared channel (PUSCH), or as a media access control (MAC)-control element (CE).

16. The apparatus of claim 13, wherein the request to modify the gap pattern includes a request to modify a gap length of the one or more gaps in the gap pattern, and wherein the instructions, when executed by the processor, cause the apparatus to:
modify the gap length of the one or more gaps in the gap pattern based on the request.

17. The apparatus of claim 16, wherein the instructions, when executed by the processor, cause the apparatus to receive the request in the uplink channel including receiving the request in a physical uplink control channel (PUCCH), or a physical uplink shared channel (PUSCH), or as a media access control (MAC)-control element (CE).

18. The apparatus of claim 13, wherein the request to modify the gap pattern includes a request to include, in the gap pattern, multiple gaps where at least one gap of the multiple gaps has a different duration than at least one other gap of the multiple gaps, and wherein the instructions, when executed by the processor, cause the apparatus to:
   modify the gap pattern to include the multiple gaps where the at least one gap has a different duration than the at least one other gap.

19. The apparatus of claim 13, wherein the instructions, when executed by the processor, cause the apparatus to transmit the indication of the gap pattern in radio resource control (RRC) signaling, a media access control (MAC)-control element (CE), or downlink control information (DCI).

20. The apparatus of claim 13, wherein the time period is a symbol.

21. An apparatus for wireless communication, comprising:
   a processor;
   a memory coupled with the processor; and
   instructions stored in the memory and operable, when executed by the processor, to cause the apparatus to:
      receive, from a network node, an indication of a gap pattern of one or more gaps within a time period, wherein the gap pattern includes multiple gaps having different durations within a slot, wherein the indication indicates an index of the gap pattern in a list of gap patterns and associated identifiers obtained from the memory;
      transmit a signal to the network node in periods of the time period that do not correspond to the one or more gaps; and
      refrain from transmitting the signal to the network node during the one or more gaps.

22. The apparatus of claim 21, wherein the indication is received in one of downlink control information (DCI), media access control (MAC)-control element (CE), or radio resource control (RRC) signaling.

23. The apparatus of claim 21, wherein the instructions, when executed by the processor, cause the apparatus to receive, from the network node, an update of the gap pattern including multiple gaps where at least one gap of the multiple gaps has a different duration than at least one other gap of the multiple gaps.

24. An apparatus for wireless communication, comprising:
   a processor;
   a memory coupled with the processor; and
   instructions stored in the memory and operable, when executed by the processor, to cause the apparatus to:
      transmit, to a user equipment (UE), an indication of a gap pattern of one or more gaps within a time period, wherein the indication indicates an index of the gap pattern in a list of gap patterns and associated identifiers configured at the UE, wherein the gap pattern includes multiple gaps having different durations within a slot;
      transmit a signal to a receiving node during the time period; and
      measure, during the one or more gaps, self-interference caused by reflection of the signal as received at a receiver of the apparatus.

25. The apparatus of claim 24, wherein the gap pattern specifies the one or more gaps as gaps of the time period during which at least one of the apparatus or the UE does not transmit signals.

26. The apparatus of claim 24, wherein the indication is transmitted in one of downlink control information (DCI), media access control (MAC)-control element (CE), or radio resource control (RRC) signaling.

27. The apparatus of claim 24, wherein the indication specifies an identifier of the gap pattern to enable the UE to obtain the gap pattern from a stored list of gap patterns.

28. The apparatus of claim 24, wherein the instructions, when executed by the processor, cause the apparatus to transmit, to the UE, an update of the gap pattern including multiple gaps where at least one gap of the multiple gaps has a different duration than at least one other gap of the multiple gaps.

29. The apparatus of claim 28, wherein the instructions, when executed by the processor, cause the apparatus to detect a change in time mobility of the UE, wherein the instructions, when executed by the processor, cause the apparatus to update the gap pattern based on the change in time mobility.

* * * * *